United States Patent
You et al.

(10) Patent No.: US 10,868,285 B2
(45) Date of Patent: Dec. 15, 2020

(54) POUCH TYPE BATTERY CELL INCLUDING ELECTRODE LEAD OF BENDING STRUCTURE

(71) Applicant: LG CHEM, LTD., Seoul (KR)

(72) Inventors: Min Kyu You, Daejeon (KR); Ho Suk Shin, Daejeon (KR); Hong Kyu Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 19 days.

(21) Appl. No.: 15/750,973

(22) PCT Filed: Sep. 20, 2016

(86) PCT No.: PCT/KR2016/010434
§ 371 (c)(1),
(2) Date: Feb. 7, 2018

(87) PCT Pub. No.: WO2017/065417
PCT Pub. Date: Apr. 20, 2017

(65) Prior Publication Data
US 2018/0241015 A1    Aug. 23, 2018

(30) Foreign Application Priority Data
Oct. 15, 2015 (KR) .................. 10-2015-0144084

(51) Int. Cl.
*H01M 2/08* (2006.01)
*H01M 10/052* (2010.01)
(Continued)

(52) U.S. Cl.
CPC ............. *H01M 2/08* (2013.01); *H01M 2/021* (2013.01); *H01M 2/026* (2013.01);
(Continued)

(58) Field of Classification Search
None
See application file for complete search history.

(56) References Cited

U.S. PATENT DOCUMENTS 8,445,125 B2    5/2013   Baek
8,673,676 B2 *  3/2014   Kim .................. H01L 31/02363
                                              257/E21.229
(Continued)

FOREIGN PATENT DOCUMENTS

JP    2011181300 A  *  9/2011
JP    2011207948 A  * 10/2011
(Continued)

OTHER PUBLICATIONS

International Search Report for PCT/KR2016/010434 dated Dec. 8, 2016.

*Primary Examiner* — Zhongqing Wei
(74) *Attorney, Agent, or Firm* — Birch, Stewart, Kolasch & Birch, LLP (57) ABSTRACT

The present invention provides a battery cell including: an electrode assembly configured of a positive electrode, a negative electrode, and a separation membrane; and a battery case in which a sealing surplus part is formed at an external circumference in a state that the electrode assembly is built in a receiving unit, wherein the battery case is formed of a sheet-shaped structure having a first surface and a second surface opposite to the first surface, an electrode terminal of the sheet-shaped structure is protruded through one side sealing surplus part of the battery case, and the electrode terminal is in contact with one surface or the other surface opposite to the one surface of the sealing surplus part in a state that the electrode terminal is bent in the first surface direction or the second surface direction of the battery case at the protrude part.

17 Claims, 8 Drawing Sheets

(51) Int. Cl.

| | |
|---|---|
| *H01M 10/058* | (2010.01) |
| *H01M 10/04* | (2006.01) |
| *H01M 2/06* | (2006.01) |
| *H01M 10/42* | (2006.01) |
| *H01M 2/02* | (2006.01) |
| *H01M 2/10* | (2006.01) |
| *H01M 2/30* | (2006.01) |
| *H01M 2/26* | (2006.01) |
| *H01M 2/22* | (2006.01) |
| *H01M 10/0525* | (2010.01) |
| *H01M 10/0565* | (2010.01) |

(52) U.S. Cl.
CPC ....... *H01M 2/0212* (2013.01); *H01M 2/0215* (2013.01); *H01M 2/0262* (2013.01); *H01M 2/0275* (2013.01); *H01M 2/0287* (2013.01); *H01M 2/06* (2013.01); *H01M 2/1016* (2013.01); *H01M 2/30* (2013.01); *H01M 10/0413* (2013.01); *H01M 10/0431* (2013.01); *H01M 10/0436* (2013.01); *H01M 10/052* (2013.01); *H01M 10/058* (2013.01); *H01M 10/425* (2013.01); *H01M 2/22* (2013.01); *H01M 2/26* (2013.01); *H01M 10/0525* (2013.01); *H01M 10/0565* (2013.01); *H01M 2220/10* (2013.01); *H01M 2220/20* (2013.01); *H01M 2220/30* (2013.01); *Y02E 60/10* (2013.01); *Y02T 10/70* (2013.01)

(56) References Cited

U.S. PATENT DOCUMENTS

| | | | |
|---|---|---|---|
| 9,190,633 | B2 | 11/2015 | Lee et al. |
| 9,484,592 | B2 | 11/2016 | Roh et al. |
| 2007/0141460 | A1* | 6/2007 | You .......................... H01M 2/08 |
| | | | 429/185 |
| 2013/0216880 | A1* | 8/2013 | Park .................... H01M 10/045 |
| | | | 429/94 |
| 2014/0255761 | A1 | 9/2014 | Kong |

FOREIGN PATENT DOCUMENTS

| | | |
|---|---|---|
| JP | 2015-173219 A | 10/2015 |
| KR | 10-2005-0036632 A | 4/2005 |
| KR | 10-2005-0066120 A | 6/2005 |
| KR | 10-2009-0105319 A | 10/2009 |
| KR | 10-2011-0082747 A | 7/2011 |
| KR | 10-2013-0047151 A | 5/2013 |
| KR | 10-2013-0137299 A | 12/2013 |
| KR | 10-2014-0057701 A | 5/2014 |

\* cited by examiner

FIG. 1

Prior Art

POUCH TYPE BATTERY CELL INCLUDING ELECTRODE LEAD OF BENDING STRUCTURE

FIELD OF THE INVENTION

This application claims priority to and the benefit of Korean Patent Application No. 10-2015-0144084 filed in the Korean Intellectual Property Office on Oct. 15, 2015, the entire contents of which are incorporated herein by reference.

The present invention relates to a pouch-type battery cell including an electrode lead with a bending structure.

BACKGROUND

A rechargeable battery is widely used as a power source for mobile devices such as a mobile phone, a laptop, a camcorder, etc.

Particularly, the use of the lithium rechargeable battery is rapidly increasing due to the advantages of a high operating voltage and a high energy density per unit weight.

The lithium rechargeable battery may be classified into a lithium ion battery, a lithium ion polymer battery, a lithium polymer battery, etc., according to a configuration of an electrode and an electrolyte solution, and among them, the use of a lithium ion polymer battery which has a lower possibility of leakage of an electrolyte solution and is easy to manufacture is increasing.

A lithium ion polymer battery (LiPB) has a structure in which an electrode assembly including electrodes (a positive electrode and a negative electrode) and a separation membrane that are thermally fused and impregnated with an electrolytic solution, and is mainly used in a form in which the electrode assembly is sealed in a pouch-type case made of an aluminum laminate sheet.

Accordingly, the lithium ion polymer battery is sometimes referred to as a pouch-type battery.

Figure 1:
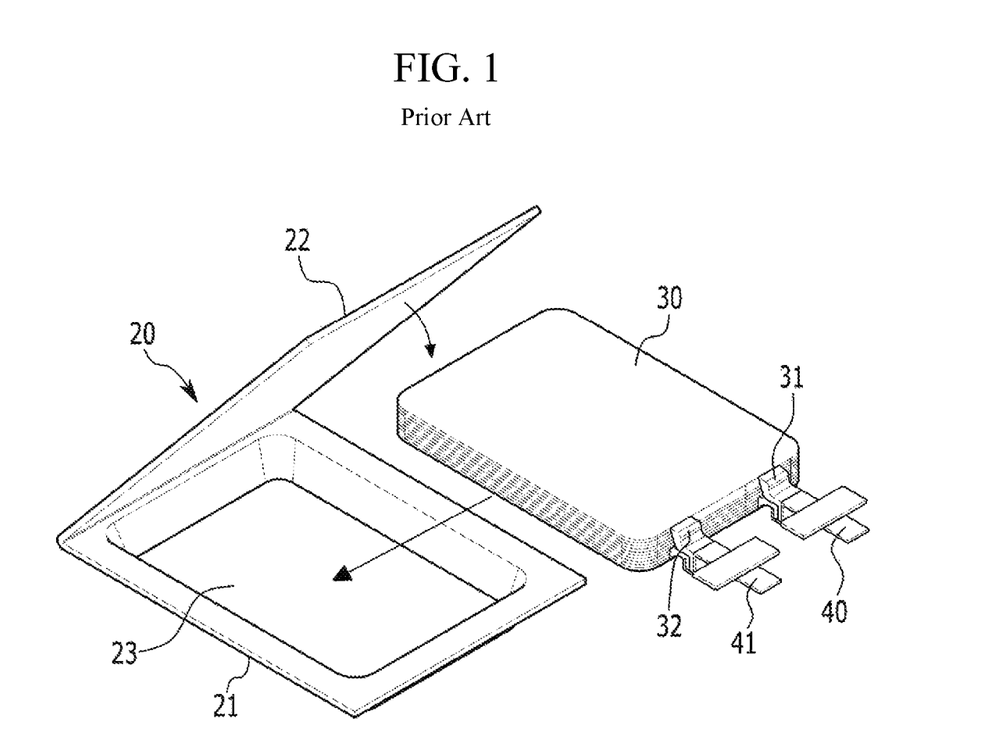
FIG. 1 is an exploded perspective view of a conventional pouch-type battery.
Figure 2:
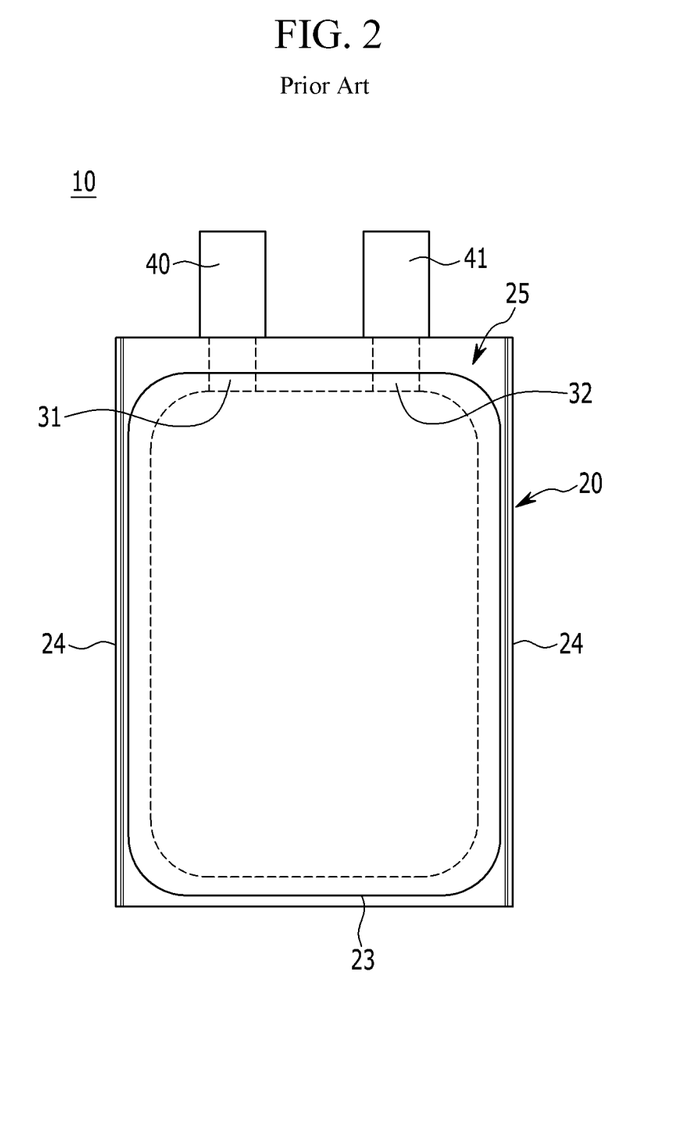
FIG. 2 is a bottom view of the pouch-type battery of FIG. 1.

FIG. 1 schematically shows a plan view of a typical pouch-type battery including a stacked type of electrode assembly, and FIG. 2 schematically shows a bottom view of the pouch-type battery of FIG. 1.

Referring to FIG. 1, a battery cell 10 is made of a structure in which an electrode assembly 30 made of a positive electrode, a negative electrode, and a separation membrane disposed therebetween is built in a battery case 20 of a pouch type, and positive and negative electrode tabs 31 and 32 thereof are respectively welded to two electrode terminals 40 and 41 and sealed to be exposed outside the battery case 20.

The battery case 20 is formed of a flexible packing material such as an aluminum laminate sheet, and includes a case main body 21 including a receiving unit 23 with a concave shape in which the electrode assembly 30 may be seated and a cover 22 having one side connected to the main body 21.

For the electrode assembly 30 used in the battery cell 10, in addition to the stacked type of structure as shown in FIG. 1, a jelly-roll type of structure or a stacked/folding type of structure is possible.

In the stacked type of electrode assembly 30, the plurality of positive electrode tabs 31 and the plurality of negative electrode tabs 32 are respectively welded to the electrode terminals 40 and 41.

Referring to FIG. 2 along with FIG. 1, both parts of the receiving unit 23 of the battery case 20 are pressed and heated by a press, thereby sealed sealing parts 24 are formed, and the sealing parts 24 are bent at both sides of the receiving unit 23 and are in close contact to minimize a volume of the battery cell.

An upper end of the battery case 20 is pressed and heated by the press like the sealing parts 24, and thereby a sealed sealing surplus part 25 is formed.

However, differently from the sealing parts 24, since the electrode tabs 31 and 32 and the electrode terminals 40 and 41 are connected to the inside of the sealing surplus part 25, the sealing surplus part 25 may not be bent in the receiving unit 23 direction of the battery case 20, and accordingly the volume of the battery cell may not be minimized.

Resultantly, the electrode terminals 40 and 41 protruded from the sealing surplus part 25 are responsible for deteriorating the energy density per unit volume of the battery.

Therefore, a battery cell which may solve the above-mentioned problem is very necessary.

The above information disclosed in this Background section is only for enhancement of understanding of the background of the invention and therefore it may contain information that does not form the prior art that is already known in this country to a person of ordinary skill in the art.

SUMMARY OF THE INVENTION

An object of the present invention is to solve the problems of the prior art and other technical problems from the past.

The present invention provides a battery cell with improved energy density per unit volume of a battery by minimizing a space formed due to a protruded electrode terminal.

A battery cell according to the present invention includes an electrode assembly configured of a positive electrode, a negative electrode, and a separation membrane, and a battery case in which a sealing surplus part is formed at an external circumference in a state that the electrode assembly is built in a receiving unit, wherein the battery case is formed of a sheet-shaped structure having a first surface and a second surface opposite to the first surface, an electrode terminal of the sheet-shaped structure is protruded through one side sealing surplus part of the battery case, and the electrode terminal is in contact with one surface or the other surface opposite to the one surface of the sealing surplus part in a state that the electrode terminal is bent in the first surface direction or the second surface direction of the battery case at the protruded part.

The first surface may mean a horizontal surface where the receiving unit of the electrode assembly is formed, and the second surface may mean the horizontal surface where a cover of the battery case opposite to the receiving unit is positioned.

Accordingly, as the battery cell according to the present invention is made of a structure in which the electrode terminal is bent in the first surface direction or second surface direction of the battery case to be in contact with one surface or the other surface of the sealing surplus part, the space formed due to the protrusion of the electrode terminal is minimized, thereby improving the energy density per unit volume of the battery.

The electrode assembly may be made of a folding structure, a stacked type of structure, a stacked/folding type of structure, or a lamination/stacked type of structure.

The folding structure, the stacked type of structure, the stacked/folding type of structure, and the lamination/stacked type of structure will be described as follows.

First, a unit cell of the folding type of structure may be manufactured by positioning and winding a separation membrane sheet between a positive electrode and a negative electrode of a sheet shape that is dried and pressed after coating a composite including an electrode active material to each of metal current collectors.

The unit cell of the stacked type of structure may be manufactured by interposing and depositing the separation membrane that is cut with a predetermined size corresponding to the positive electrode plate and the negative electrode plate between the positive electrode plate and the negative electrode plate that is cut with the predetermined size after coating, and then drying and pressing the composite including the electrode active material to each metal current collector.

The unit cell of the stacked/folding type of structure as the structure where the positive electrode and the negative electrode face each other may include two or more unit cells in which two or more electrode plates are stacked and may be manufactured by winding the unit cell with at least one separation film with a non-overlapped shape, or bending the separation film with a size of the unit cell and interposing it between the unit cells.

If necessary, as the structure where the positive electrode and the negative electrode face each other, at least one single electrode plate may be additionally included between any unit cells and/or at the outer surface of the outermost unit cell.

The unit cell may be an S-type unit cell in which the electrode plates of both outermost sides have the same polarity, and a D-type unit cell in which the electrode plates of both outermost sides have opposite polarities.

The S-type unit cell may be an SC-type unit cell where the electrode plates of both outermost sides are positive electrodes and an SA-type unit cell where the electrode plates of both outermost sides are negative electrodes.

The unit cell of the lamination/stacked type of structure may be manufactured by sequentially stacking the negative electrode, the separation membrane on the negative electrode, and the positive electrode, and the separation membrane thereon from the bottom after coating, then drying and pressing the electrode composite to each metal current collector, and then cutting them to a predetermined size.

The battery case may be made of the laminate sheet including a resin outer layer, a barrier metal layer, and a heat-fusible resin sealant layer.

Since the resin outer layer must have excellent resistance to the external environment, it is necessary to have tensile strength and weather resistance of more than predetermined values.

From this aspect, as the polymer resin of the outer resin layer, polyethylene terephthalate (PET) and a stretching nylon film may be preferably used.

For the barrier metal layer, in order to exhibit the function of improving the strength of the battery case in addition to the function of preventing an inflow or a leakage of a foreign matter such as a gas and moisture, aluminum may be preferably used.

The resin sealant layer may preferably use a polyolefin-based resin so as to have thermal fusibility (thermal adhesiveness) and low hygroscopicity to suppress penetration of an electrolyte solution, and to not be swollen or eroded by the electrolyte solution, and more preferably cast polypropylene (CPP) may be used.

In one example of the present invention, an adherence member may be interposed between the sealing surplus part and the electrode terminal to maintain the bend of the electrode terminal and the contact state for the sealing surplus part.

As a detailed example, the adherence member may be a double-sided adhesive tape.

As another example, the adherence member may be a curable adhesive.

As another example, the adherence member may be an adhesive.

The adherence member may be the double-sided adhesive tape, the curable adhesive, or the adhesive, however it is not limited thereto as long as the material may maintain the bend of the electrode terminal and the contact state of the electrode terminal for the sealing surplus part.

In an example of the present invention, one surface of the sealing surplus part may be positioned at the first surface of the battery case and the other surface of the sealing surplus part may be positioned at the second surface of the battery case, and the electrode terminal may be in contact with one surface or the outer surface of the sealing surplus part as the part protruded from the sealing surplus part is bent by 180 degrees.

In another detailed example, one surface of the sealing surplus part may be positioned at the first surface of the battery case, and the electrode terminal may be in contact with one surface of the sealing surplus part as the part protruded from the sealing surplus part is bent by 180 degrees in the receiving unit direction.

In another detailed example, the other surface of the sealing surplus part may be positioned at the second surface of the battery case, and the electrode terminal may be in contact with the other surface of the sealing surplus part as the part protruded from the sealing surplus part is bent by 180 degrees in the cover direction of the battery case.

In another example of the present invention, the electrode terminal may be made of a first electrode lead and a second electrode lead.

That is, the positive terminal and the negative electrode terminal may be made of the first electrode lead and the second electrode lead as electrode leads of two units.

The electrode tabs of the electrode assembly may be bonded to the end of the first electrode lead and the end of the second electrode lead that are positioned at the receiving unit, thereby forming an electrical connection.

In detail, the positive electrode tabs of the electrode assembly may be bonded to the end of the first positive electrode lead and the end of the second positive electrode lead, and the negative electrode tabs of the electrode assembly may be bonded to the end of the second negative electrode lead and the end of the second negative electrode lead.

Also, the first electrode lead and the second electrode lead may be bonded to the electrode tabs by laser welding in a state that the mutual ends are overlapped.

The first electrode lead may be bent in the first surface direction of the battery case to be in contact with one surface of the sealing surplus part, and the second electrode lead may be bent in the second surface direction of the battery case to be in contact with the other surface of the sealing surplus part.

In detail, the first positive electrode lead and the first negative electrode lead may be bent in the first surface direction of the battery case to be in contact with one surface of the sealing surplus part, and the second positive electrode lead and the second negative electrode lead may be bent in the second surface direction of the battery case to be in contact with the other surface of the sealing surplus part.

An adherence member may be interposed between the first electrode lead and one surface of the sealing surplus part and between the second electrode lead and the other surface of the sealing surplus part.

The adherence member may be the double-sided adhesive tape, the curable adhesive, or the adhesive, however it is not limited thereto as long as the material may maintain the bend of the electrode terminal and the contact state of the electrode terminal for the sealing surplus part.

Also, in the sealing surplus part, an insulating film may be interposed at an interface of the electrode terminal and the battery case to increase the adherence between the electrode terminal and the battery case, to prevent a short between the electrode terminal and the metal layer of the laminate sheet of the battery case, and to improve sealability of the battery case.

The battery cell may be a lithium rechargeable battery, and in detail, it may be a lithium ion battery or a lithium ion polymer battery.

In general, the lithium rechargeable battery is configured of the positive electrode, the negative electrode, the separation membrane, and a lithium salt-containing non-aqueous electrolyte.

The positive electrode, for example, may be manufactured by coating and drying a mixture of a positive active material, a conductive material, and a binder on a positive electrode current collector, and if necessary, a filler is further added to the mixture.

The positive active material may include layered compounds or compounds substituted with one or more transition metals such as lithium cobalt oxide ($LiCoO_2$) and lithium nickel oxide ($LiNiO_2$); lithium manganese oxides of the chemical formulae $Li_{1+x}Mn_{2-x}O_4$ (wherein x is 0-0.33), $LiMnO_3$, $LiMn_2O_3$, $LiMnO_2$, and the like; lithium copper oxide ($Li_2CuO_2$); vanadium oxides such as $LiV_3O_8$, $LiV_3O_4$, $V_2O_5$, and $Cu_2V_2O_7$; Ni-site lithium nickel oxides represented by the chemical formula $LiNi_{1-x}M_xO_2$ (wherein M=Co, Mn, Al, Cu, Fe, Mg, B, or Ga, and x=0.01-0.3); lithium manganese composite oxides represented by the chemical formula $LiMn_{2-x}M_xO_2$ (wherein M=Co, Ni, Fe, Cr, Zn, or Ta, and x=0.01-0.1), or $Li_2Mn_3MO_8$ (wherein M=Fe, Co, Ni, Cu, or Zn); $LiMn_2O_4$ in which some of Li of the chemical formula is substituted with an alkaline-earth metal ion; disulfide compounds; $Fe_2(MoO_4)_3$ and the like, but is not limited thereto.

The conductive material is added at 1 to 30% by weight, based on the total weight of the mixture including the positive active material.

This conductive material is not particularly limited as long as it does not cause chemical changes in the battery, and has conductivity, and for example, graphite such as natural graphite or artificial graphite; carbon blacks such as carbon black, acetylene black, ketjen black, channel black, furnace black, lamp black, and summer black; conductive fiber such as carbon fiber or metal fiber; metal powder such as carbon fluoride, aluminum, and nickel powder; conductive whiskers such as zinc oxide and potassium titanate; conductive metal oxides such as titanium oxide; conductive materials such as a polyphenylene derivative; and the like may be used.

The binder is a component assisting in binding the active material and the conductive material and the like, and binding for the current collector, and is generally added at 1 to 30% by weight, based on the total weight of the mixture including the positive active material.

The example of this binder may include polyfluorovinylidene, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butadiene rubber, fluorine rubber, various copolymers, and the like.

The filler is a component suppressing the expansion of the positive electrode, is optionally used, and is not particularly limited as long as it does not cause chemical changes in the battery and is a fibrous material, and for example, olefin-based polymers such as polyethylene and polypropylene, and fibrous materials such as glass fiber and carbon fiber, may be used.

The negative electrode is manufactured by coating the negative electrode active material on the negative electrode current collector and/or the extension current collecting part, and drying it, and if necessary, the components as described above may be optionally further included.

The negative electrode active material may include, for example, carbon such as hard carbon and graphite-based carbon; metal composite oxides such as $Li_xFe_2O_3$ ($0 \leq x \leq 1$), $Li_xWO_2$ ($0 \leq x \leq 1$), and $Sn_xMe_{1-x}Me'_yO_z$ (Me: Mn, Fe, Pb, Ge; Me': Al, B, P, Si, groups 1, 2, and 3 elements of the periodic table, a halogen; $0 \leq x \leq 1$; $1 \leq y \leq 3$; $1 \leq z \leq 8$); lithium metal; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; Li—Co—Ni-based materials; and the like.

The separation membrane is interposed between the positive electrode and the negative electrode, and an insulating thin film having high ion permeability and mechanical strength is used.

The separation membrane has a pore diameter of generally 0.01-10 μm, and a thickness of 5-300 μm.

As this separation membrane, for example, olefin-based polymers such as chemical resistant and hydrophobic polypropylene; a sheet or non-woven fabric made of glass fiber or polyethylene; and the like are used.

In the case that a solid electrolyte such as a polymer is used as the electrolyte, the solid electrolyte may also serve as the separation membrane.

The lithium salt-containing non-aqueous electrolyte solution is composed of a polar organic electrolyte solution and a lithium salt.

As the electrolyte solution, a non-aqueous liquid electrolyte solution, an organic solid electrolyte, an inorganic solid electrolyte, etc. are used.

The non-aqueous liquid electrolyte solution may include, for example, aprotic organic solvents such as N-methyl-2-pyrrolidinone, propylene carbonate, ethylene carbonate, butylene carbonate, dimethyl carbonate, diethyl carbonate, γ-butyrolactone, 1,2-dimethoxy ethane, tetrahydroxy Franc, 2-methyl tetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, dioxolane derivative, sulfolane, methyl sulfolane, 1,3-dimethyl-2-imidazolidinone, propylene carbonate derivative, tetrahydrofuran derivatives, ether, propionic acid methyl, and ethyl propionate.

The organic solid electrolyte may include, for example, polyethylene derivatives, polyethylene oxide derivatives, polypropylene oxide derivatives, phosphate ester polymers, poly agitation lysine, polyester sulfide, polyvinyl alcohol, polyfluorovinylidene, polymers including an ionic dissociation group, and the like.

The inorganic solid electrolyte may include, for example, nitrides, halides, sulfides, or the like of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material which is readily soluble in the non-aqueous electrolyte, and for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carbonic acid lithium, 4-phenyl lithium borate, imides, and the like may be used.

Further, to the non-aqueous electrolyte solution, for the purpose of improving charge and discharge characteristics, flame retardancy, and the like, for example, pyridine, triethylphosphite, triethanolamine, cyclic ether, ethylene diamine, n-glyme, triamide hexaphosphate, nitrobenzene derivatives, sulfur, quinoneimine dyes, N-substituted oxazolidinone, N,N-substituted imidazolidine, ethylene glycol dialkyl ether, ammonium salts, pyrrole, 2-methoxy ethanol, aluminum trichloride, and the like may be added.

In some cases, for imparting incombustibility, a halogen-containing solvent such as carbon tetrachloride and ethylene trifluoride may be further included, and for improving high temperature storage characteristics, carbon dioxide gas may be further included.

The present invention also provides a battery pack including two or more battery cells.

The present invention provides a device including the battery pack as a power source.

The device may be selected from a mobile phone, a wearable electronic device, a portable computer, a smart pad, a netbook, a light electronic vehicle (LEV), an electric car, a hybrid electric vehicle, a plug-in hybrid electric car, and an electric power storage device.

A structure of these devices and a manufacturing method thereof are disclosed in the art such that the detailed description thereof is omitted in the present specification.

As described above, as the battery cell according to the present invention is made with the structure in which the electrode terminal is bent in the first surface direction or the second surface direction of the battery case to be in contact with one surface or the other surface of the sealing surplus part, the space formed due to the protrusion of the electrode terminal may be minimized, thereby improving the energy density per unit volume of the battery.

DETAILED DESCRIPTION OF THE EMBODIMENTS

Hereinafter, the present invention will be described with reference to the drawings according to the exemplary embodiment of the present invention, however, this is for easier understanding of the present invention, and the scope of the present invention is not limited thereby.

Figure 3:
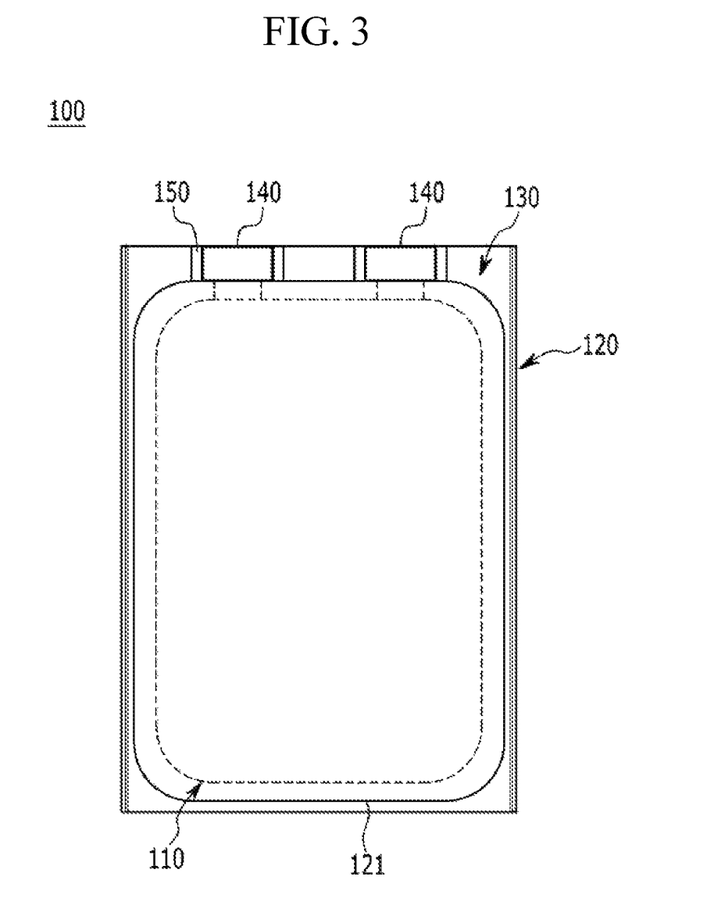
FIG. 3 is a first horizontal plan view of a battery cell according to an example of the present invention.
Figure 4:
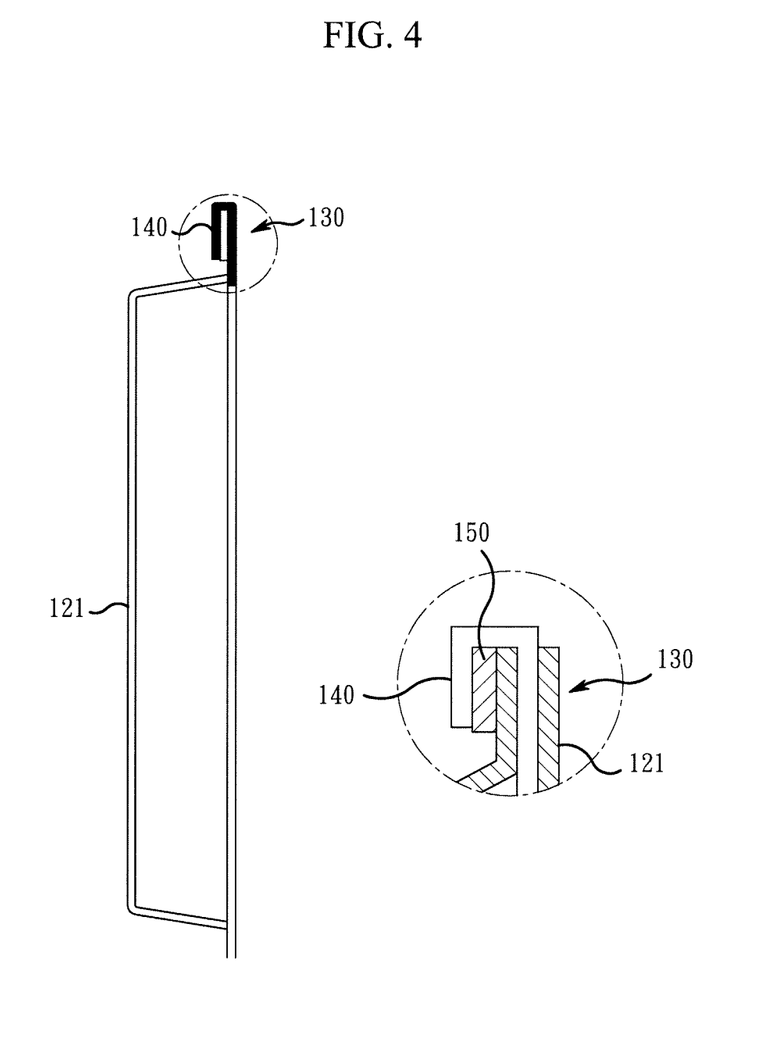
FIG. 4 is a lateral view of the battery cell of FIG. 3.

FIG. 3 schematically shows a first horizontal plan view of a battery cell according to an example of the present invention, and FIG. 4 schematically shows a lateral view of the battery cell of FIG. 3.

Referring to FIG. 3 and FIG. 4, a battery cell 100 includes an electrode assembly 110 configured of a positive electrode, a negative electrode, and a separation membrane, and a battery case 120.

The battery case 120 is formed of a sheet-shaped structure, a receiving unit 121 in which the electrode assembly 110 is housed is formed, and a sealing surplus part 130 is formed at an upper end of an external circumference of the battery case 120.

An electrode terminal 140 is formed via the sealing surplus part 130 to be protruded, and is bent by 180 degrees in a first surface direction as the receiving unit 121 direction of the battery case 120 at the protruded part to be in contact with an inner surface of the sealing surplus part 130.

An adherence member 150 is interposed between the electrode terminal 140 and the sealing surplus part 130 to maintain the bend of the electrode terminal 140 and the contact state for the sealing surplus part 130.

The adherence member 150 may be made of a double-sided adhesive tape, a curable adhesive, or an adhesive.

Figure 5:
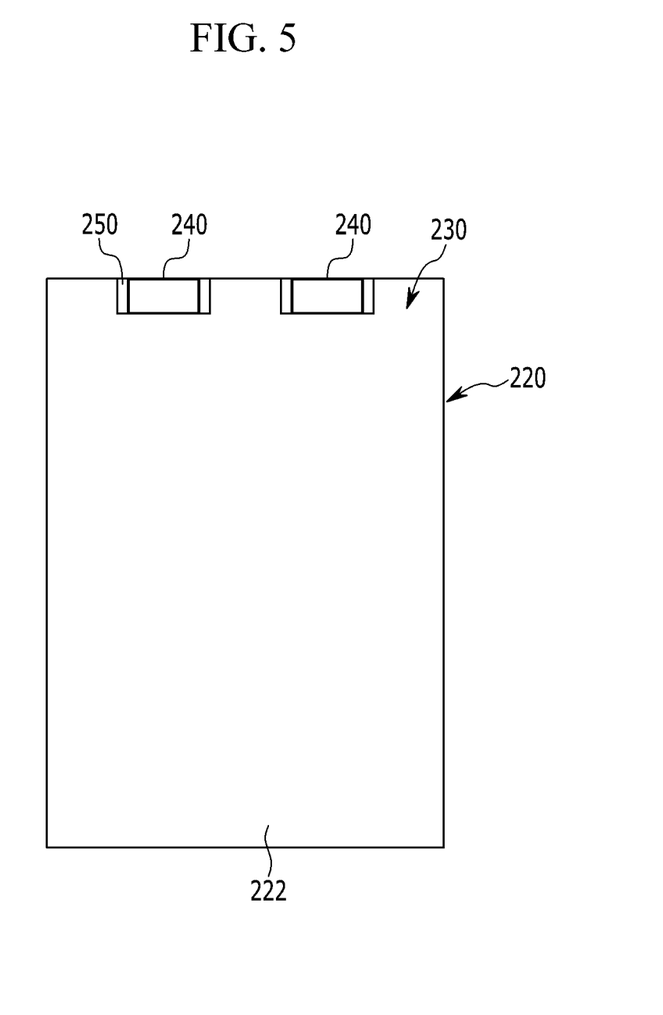
FIG. 5 is a second horizontal plan view of a battery cell according to another example of the present invention.
Figure 6:
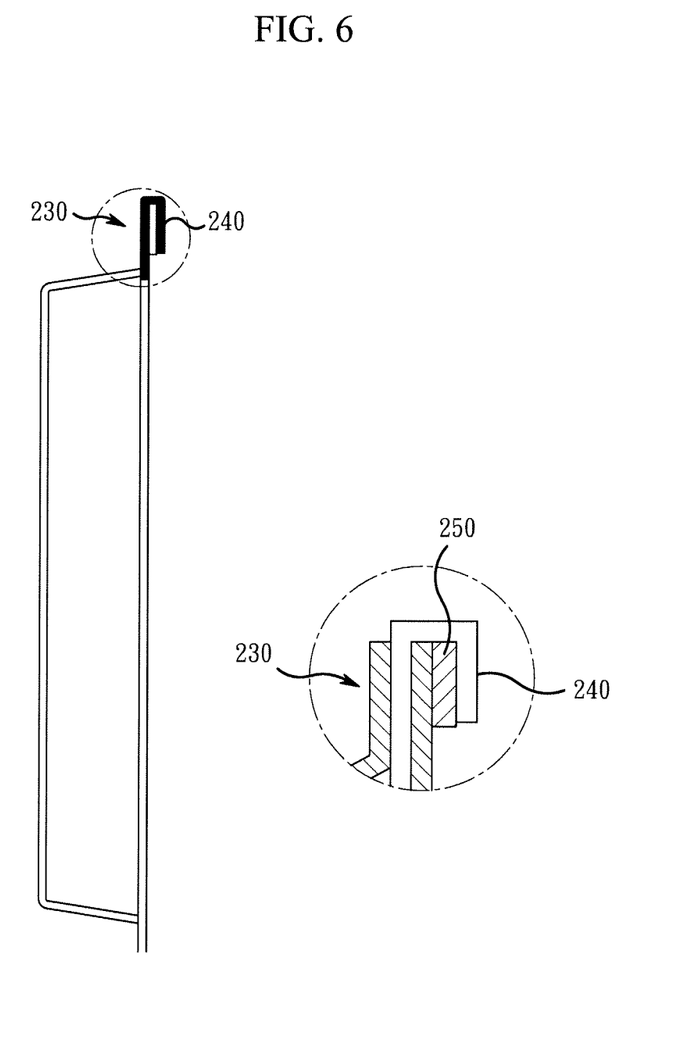
FIG. 6 is a lateral view of the battery cell of FIG. 5.

FIG. 5 schematically shows a second horizontal plan view of a battery cell according to another example of the present invention, and FIG. 6 schematically shows a lateral view of the battery cell of FIG. 5.

Referring to FIG. 5 and FIG. 6, an electrode terminal 240 is formed via a sealing surplus part 230 to be protruded, and is bent by 180 degrees in a second surface direction as a cover 222 direction of a battery case 220 at the protruded part to be in contact with the outer surface of the sealing surplus part 230.

An adherence member 250 is interposed between the electrode terminal 240 and the sealing surplus part 230 to maintain the bend of the electrode terminal 240 and the contact state for the sealing surplus part 230.

The adherence member 250 may be made of the double-sided adhesive tape, the curable adhesive, or the adhesive.

The rest of the structure except for the bending direction of the electrode terminal is the same as the example described in FIG. 3 and FIG. 4 such that the description thereof is omitted.

Figure 7:
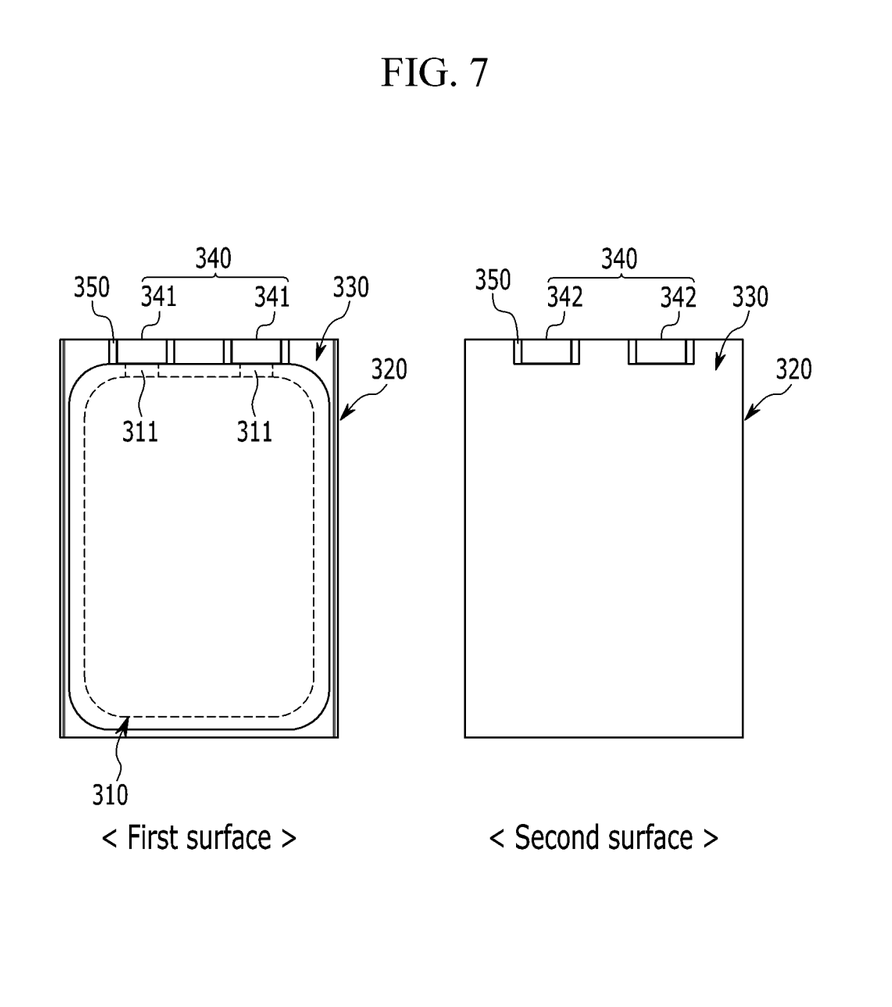
FIG. 7 is a first horizontal plan view and a second horizontal plan view of a battery cell according to another example of the present invention.
Figure 8:
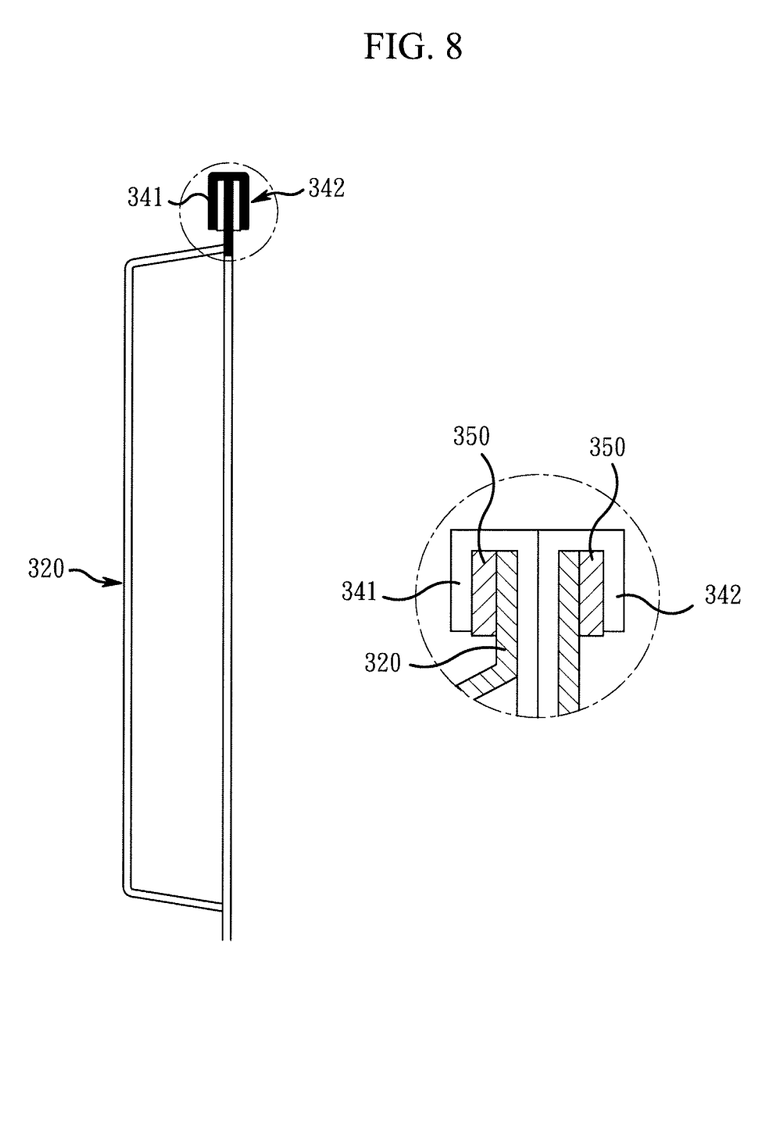
FIG. 8 is a lateral view of the battery cell of FIG. 7.

FIG. 7 schematically shows a first horizontal plan view and a second horizontal plan view of a battery cell according to another example of the present invention, and FIG. 8 schematically shows a lateral view of the battery cell of FIG. 7.

Referring to FIG. 7 and FIG. 8, an electrode terminal 340 is made of a first electrode lead 341 and a second electrode lead 342.

Electrode tabs 311 of an electrode assembly 310 are bonded to ends of the first electrode lead 341 and the second electrode lead 342, thereby forming an electrical connection.

The first electrode lead 341 and the second electrode lead 342 are bonded to the electrode tabs 311 by laser welding in a state in which the ends are mutually overlapped.

The first electrode lead 341 is bent in the first surface direction of a battery case 320 to be in contact with the inner surface of a sealing surplus part 330, and the second electrode lead 342 is bent in the second surface direction of the battery case 320 to be in contact with the outer surface of the sealing surplus part 330.

An adherence member 350 is interposed between the first electrode lead 341 and the inner surface of the sealing surplus part 330 and between the second electrode lead 342 and the outer surface of the sealing surplus part 330 to maintain the bend of the electrode terminal 340 and the contact state for the sealing surplus part 330.

The adherence member 350 may be made of the double-sided adhesive tape, the curable adhesive, or the adhesive.

In the sealing surplus part 330, an insulating film (not shown) is interposed at an interface of the electrode terminal 340 and the battery case 320.

The rest of the structure except for a structure in which the electrode terminal is made of the first electrode lead and the second electrode lead of two units and the bending direction of the electrode terminal is the same as the example described in FIG. 3 and FIG. 4 such that the description thereof is omitted.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A battery cell comprising:
an electrode assembly configured of a positive electrode, a negative electrode, and a separation membrane; and
a battery case in which a sealing surplus part is formed at an external circumference in a state that the electrode assembly is built in a receiving unit,
wherein the battery case is formed of a sheet-shaped structure having a first surface and a second surface opposite to the first surface,
an electrode terminal of the sheet-shaped structure is protruded through one side of the sealing surplus part of the battery case, and the electrode terminal is in contact with a first outer surface of the sealing surplus part or a second outer surface of the sealing surplus part opposite to the first outer surface of the sealing surplus part in a state that a protruded part of the electrode terminal is bent to overlap one of the first outer surface or the second outer surface of the sealing surplus part,
an adherence member is interposed between and directly contacting the protruded part of the electrode terminal and the first outer surface or the second outer surface of the sealing surplus part to maintain the bend of the protruded part of the electrode terminal, and
the electrode terminal has an uninterrupted width over an entire length of the electrode terminal.

2. The battery cell of claim 1, wherein
the electrode assembly is made of a folding structure, a stacked structure, a stacked/folding structure, or a lamination/stacked structure.

3. The battery cell of claim 1, wherein
the battery case is made of a laminate sheet including a resin outer layer, a barrier metal layer, and a heat-fusible resin sealant layer.

4. The battery cell of claim 1, wherein
the adherence member is a double-sided adhesive tape.

5. The battery cell of claim 1, wherein
the adherence member is a curable adhesive.

6. The battery cell of claim 1, wherein
the adherence member is an adhesive.

7. The battery cell of claim 1, wherein
the first outer surface of the sealing surplus part is formed at the first surface of the battery case, the second outer surface of the sealing surplus part is positioned at the second surface of the battery case, and the protruded part of the electrode terminal is bent by 180 degrees so that the electrode terminal is in contact with the first outer surface or the second outer surface of the sealing surplus part.

8. The battery cell of claim 1, wherein
the electrode terminal is made of a first electrode lead and a second electrode lead.

9. The battery cell of claim 8, wherein
electrode tabs of the electrode assembly are bonded to the end of the first electrode lead and the end of the second electrode lead that are positioned at the receiving unit, thereby forming an electrical connection.

10. The battery cell of claim 9, wherein
the first electrode lead and the second electrode lead are bonded to the electrode tabs by laser welding.

11. The battery cell of claim 9, wherein
the first electrode lead is bent to overlap and to contact the first outer surface of the sealing surplus part, and the second electrode lead is bent to overlap and contact the second outer surface of the sealing surplus part.

12. The battery cell of claim 11, wherein
the adherence member is a first adherence member interposed between the first electrode lead and the first outer surface of the sealing surplus part, and
a second adherence member is interposed between the second electrode lead and the second outer surface of the sealing surplus part.

13. The battery cell of claim 1, wherein
in the sealing surplus part, an insulating film is interposed at an interface of the electrode terminal and the battery case.

14. The battery cell of claim 1, wherein
the battery cell is a lithium rechargeable battery.

15. A battery pack comprising two or more battery cells of claim 1.

16. A device comprising the battery pack of claim 15 as a power source.

17. The device of claim 16, wherein
the device is selected from a mobile phone, a wearable electronic device, a portable computer, a smart pad, a netbook, a light electronic vehicle (LEV), an electric car, a hybrid electric vehicle, a plug-in hybrid electric car, and an electric power storage device.

* * * * *